(12) United States Patent  (10) Patent No.: US 8,477,095 B2
Hendrickson et al.  (45) Date of Patent: Jul. 2, 2013

(54) AUDIO BOOK FOR PEN-BASED COMPUTER (75) Inventors: Craig Hendrickson, Albany, CA (US);
Christa Sinclair, San Francisco, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 1189 days.

(21) Appl. No.: 12/121,653

(22) Filed: May 15, 2008

(65) Prior Publication Data

US 2009/0295734 A1  Dec. 3, 2009

Related U.S. Application Data

(60) Provisional application No. 60/997,972, filed on Oct. 5, 2007.

(51) Int. Cl.
*G09G 5/00*  (2006.01)

(52) U.S. Cl.
USPC ............................ 345/156; 715/727; 434/317

(58) Field of Classification Search
USPC .... 345/156, 169, 173, 179; 715/727; 434/317
See application file for complete search history.

(56) References Cited

U.S. PATENT DOCUMENTS

| | | | | |
|---|---|---|---|---|
| 5,644,557 A * | 7/1997 | Akamine et al. | ................ | 369/14 |
| 6,502,756 B1 * | 1/2003 | Fåhraeus | ...................... | 235/494 |
| 7,203,455 B2 * | 4/2007 | Ernst et al. | ..................... | 434/317 |
| 7,661,592 B1 * | 2/2010 | Chisholm et al. | ............ | 235/454 |
| 7,698,640 B2 * | 4/2010 | Krieglstein | .................... | 715/700 |
| 7,853,193 B2 * | 12/2010 | Marggraff | ..................... | 434/317 |
| 2003/0055865 A1 * | 3/2003 | Fransson et al. | .............. | 709/200 |
| 2004/0229195 A1 * | 11/2004 | Marggraff et al. | ............ | 434/169 |
| 2006/0031245 A1 * | 2/2006 | Krieglstein | ................... | 707/102 |
| 2006/0033725 A1 * | 2/2006 | Marggraff et al. | ............ | 345/179 |
| 2006/0066591 A1 * | 3/2006 | Marggraff et al. | ............ | 345/179 |
| 2006/0080608 A1 * | 4/2006 | Marggraff et al. | ............ | 715/727 |
| 2006/0127872 A1 * | 6/2006 | Marggraff | ..................... | 434/353 |
| 2006/0292543 A1 * | 12/2006 | Marggraff et al. | ............ | 434/350 |
| 2009/0002345 A1 * | 1/2009 | Burstrom | ...................... | 345/179 |
| 2009/0128520 A1 * | 5/2009 | Combe | ......................... | 345/179 |
| 2010/0302171 A1 * | 12/2010 | Yoshida | ........................ | 345/173 |

* cited by examiner

*Primary Examiner* — Tom Sheng (57) ABSTRACT

A system for producing audio output from interaction with printed material and a pen based computer system. The system includes a printed page including a substantially invisible position code and a human viewable image. The system further includes a pen-based computer system for determining a position of the human viewable image in response to interactions there between, e.g., based upon the pen tip's proximity to the image. The pen-based computer is operable to produce a human-audible output corresponding to the human viewable image contemporaneously with the interaction. The human viewable image may be produced independent of the pen based computer and may include a textual word and/or an image. A plurality of pages may be provided in book form allowing a plurality of audio recordings to be rendered in connection with a plurality of images, thusly providing an interactive audio book experience for the user.

36 Claims, 10 Drawing Sheets

AUDIO BOOK FOR PEN-BASED COMPUTER

RELATED APPLICATION

This Application claims benefit to U.S. Provisional Application 60/997,972, filed Oct. 5, 2007, entitled "Audio Book for Pen-Based Computer" to Hendrickson and Sinclair, which is hereby incorporated herein by reference in its entirety.

FIELD OF INVENTION

Embodiments of the present invention relate to the field of interactive devices and pen based computing. More specifically, embodiments of the present invention relate to systems and methods for rendering audio associated with printed media in combination with a pen based computers.

BACKGROUND

In the last twenty years, the use of personal computing devices, such as desktop computer systems, laptop computer systems, handheld computers systems, and tablet computer systems, etc., has grown tremendously. These personal computing devices provide users with a broad range of learning opportunities, interactive applications, business utilities, communication abilities, and entertainment possibilities.

Current personal computing devices provide access to these interactive applications via a user interface. Typical computing devices have on-screen graphical interfaces that present information to a user using a display device, such as a monitor, display screen or audio output, and receive information from a user using an input device, such as a mouse, a keyboard, a joystick, or a stylus.

Even more so than computing systems, reading books is ubiquitous among literate societies, and, by definition, a requirement of literacy. Wile a variety of computer-based devices have attempted to help teach people to read in a myriad of ways, typical on-screen graphical user interfaces have difficulty mimicking the "look and feel," portability durability and ease of use of conventional printed matter.

Some commercial learning and entertainment products allow a computer or electronic device to be responsive to a user's, e.g., a child's, interaction with a book. However, some of these systems require a special apparatus onto which the book must be place in order for the position of a stylus, relative to the book's pages, to be sensed or detected. Use of this apparatus may limit the portability, usability and desirability of such systems, and detract from the overall user experience.

SUMMARY OF THE INVENTION

Therefore, a need exists for systems and methods for rendering interactive audio books for pen based computers with an enhanced user experience. In addition, a need exists for systems and methods for rendering interactive audio books for pen based computers that facilitate portability. A need also exists for systems and methods for associating audio sounds with positions within printed material for pen based computers that also satisfies the above need. Such systems and methods can be used to enhance learning and entertainment of the printed matter. A further need exists for systems and methods for audio books for pen based computers that are compatible and complementary with existing pen based computers, computer peripherals, methods of web access and printing processes. Embodiments in accordance with the present invention provide for these needs.

Accordingly, in one embodiment, a system for producing audio output from interaction with printed material and a pen based computer system is disclosed. The system includes a printed page including a substantially invisible position code and a human viewable image. The system further includes a pen-based computer system for determining a position of the human viewable image in response to interactions there between, e.g., based upon the pen tip's proximity to the image. The pen-based computer is operable to produce a human-audible output corresponding to the human viewable image contemporaneously with the interaction. The human viewable image may be produced independent of the pen based computer and may include a textual word and/or an image. A plurality of pages may be provided in book form allowing a plurality of audio recordings to be rendered in connection with a plurality of images, thusly providing an interactive audio book experience for the user.

In accordance with a computer implemented method embodiment of the present invention, a method of producing audio output from a pen based computer includes loading audio content corresponding to printed material into memory associated with the pen based computer. The audio content includes audio speech of a textual word contained in the printed material. The audio content may also include other audio sounds that are associated with textual material that comprises a story or a book. The method further includes accessing an activation of a control input to the pen based computer. Responsive to the activation, audio output corresponding to the printed material is produced. In this embodiment, interaction between the pen based computer system and the printed material is not required in order to effectuate audio playback of the book title stored in the pen computer's memory.

In accordance with another embodiment of the present invention, a pen based computer includes a processor, a memory coupled to the processor and an optical detector coupled to the processor. The processor is for receiving input from the optical detector to determine a position of the pen based computer over printed material comprising a position code. The pen based computer also includes an audio transducer for producing audio output under control of the processor. The pen based computer is capable of producing audio output corresponding to the position based on the contents of the memory of the pen based computer. The printer material may include a book with pages having images printed thereon and/or text material printed thereon. Audio content associated with the textual material may include speech corresponding to the words. Audio content of voice and/or sounds may be associated with the images. The images and text of the printed material may relate to a specific title and/or theme or story that is closely associated with the book, in one embodiment.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. It is appreciated that throughout the present invention, discussions utilizing terms such as "loading" or "recognizing" or "accessing" or "producing" or "decoding" or "recording" or "interfacing" or the like, often refer to the action and processes of an electronic system (e.g., interactive device 100 of FIG. 1), or similar electronic computing device, that manipulates and transforms data represented as physical (electronic) quantities within the electronic device's registers and memories into other data similarly represented as physical quantities within the electronic device memories or registers or other such information storage, transmission or display devices.

Figure 1:
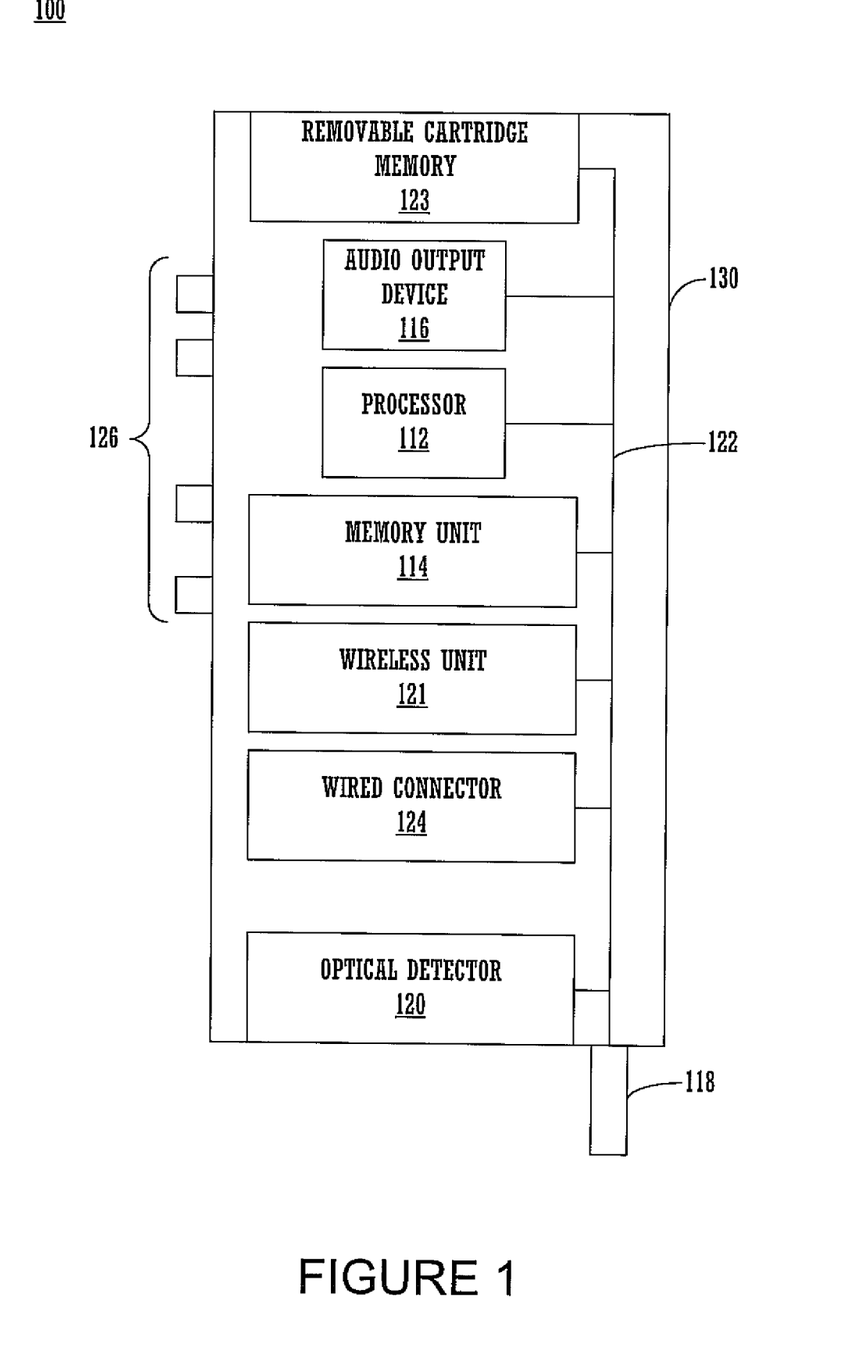
FIG. 1 illustrates an exemplary pen based computer system and interactive device, in accordance with embodiments of the present invention.

FIG. 1 illustrates an exemplary pen based computer system and interactive device 100 for use with embodiments of the present invention, in accordance with embodiments of the present invention. Interactive device 100 includes processor 112, internal memory unit 114, audio output device 116, optional surface contacting element 118, optional removable cartridge memory 123, optional wireless unit 121, optional wired connector 124 and optical detector 120 within housing 130. In one embodiment, processor 112, memory unit 114, audio output device 116, optional surface contacting element 118, optional removable cartridge memory 123, optional wireless unit 121, optional wired connector 124 and optical detector 120 are functionally coupled over bus 122. In one embodiment, optical detector 120 may also include an optical emitter. In one embodiment, housing 130 may also contain a power supply operable to power circuits and functions of interactive device 100. In one embodiment, housing 130 may also include a display and/or input buttons 126 functionally coupled with bus 122.

In accordance with embodiments of the present invention, the display of device 100 may display visual material responsive to a selection on the printed material. The display may also prompt user interaction with printed material, for example, the display may present a message of the form, "Please touch the name for the animal that looks like this."

In one embodiment, housing 130 is shaped in the form of a stylus or a writing instrument (e.g., pen-like). In this embodiment, device 100 is a pen-based computer system. A user may hold interactive device 100 in a manner similar as a pen or stylus is held. Surface contacting element 118 is located at one end of housing 130 such that a user can place surface contacting element 118 in contact with a surface (not shown). Surface contacting element 118 may include a pen, a pencil, a marker, a crayon, chalk, or any other marking material. It should be appreciated that surface contacting element 118 may also include a non-marking element such as a stylus type tip. It should also be appreciated that surface contacting element 118 may also have magnetic properties. During use, a user can hold interactive device 100 and use it in a similar manner as a writing instrument to mark a surface, or to touch a surface without marking the surface, utilizing surface contacting element 118. Surface contacting element 118 may detect contact with a surface, e.g., via pressure or displacement, and signal such contact to processor 112.

In accordance with embodiments of the present invention, device 100 may be ergonomically designed to be grasped and manipulated by a child. The terms "pen" or "pen-like" may be used to refer to device 100, even though device 100 may not have a marking tap and/or may not be of a cylindrical shape, e.g., a traditional "pen" shape. For example, the device 100 may be rendered in other shapes to facility grasping and manipulation by a small child, e.g., with small hands and less developed motor skills, in comparison with adults or other users of traditional pens.

Interactive device 100 allows users to indicate, e.g., touch or hover over, selectable items that represent or symbolize different functions provided by interactive device 100. For example, a user may touch an image printed on a surface, e.g., a surface comprising a substantially invisible position code. In another embodiment, it may not be necessary to make physical contact with the surface to determine and indicate a position. In one embodiment, the selectable item includes a symbolic representation of an application program or function executable by processor 112. Computer code for recognizing such functional selectable items and distinguishing them from other images can reside in memory unit 114 and/or removable cartridge memory 123 in interactive device 100.

Optical detector 120 is at one end of the stylus-shaped interactive device 100. Optical detector 120 is operable to detect information on a surface. In one embodiment, interactive device 100 also comprises an optical emitter for illuminating a portion of a surface that is detected by optical detector 120. The information detected by optical detector 120 is transmitted to processor 112.

Processor 112 may include any suitable electronics to implement the functions of the interactive device 100. Processor 112 can recognize selectable items, and can identify the locations of those selectable items so that interactive device 100 can perform various operations. In these embodiments, memory unit 114 and/or removable cartridge memory 123 may comprise computer code for correlating selectable items with their locations on the surface.

Memory unit 114 and/or removable cartridge memory 123 comprises computer code for performing any of the functions of the interactive device 100. In one embodiment, computer code stored in memory unit 114 and/or removable cartridge memory 123 and implemented on processor 112 is responsive to a selectable item and operable to execute a function associated with the selectable item in response to the selection.

In accordance with embodiments of the present invention, the interactive device 100 may optionally comprise wireless communications unit 121. Optional wireless communications unit 121 may implement any suitable wireless communications protocol, including, for example, Bluetooth communications, wireless Ethernet, e.g., IEEE 802.11b and/or 802.11g, Infrared Data Association (IrDA) communications and the like. Optional wireless communications unit 121 enables interactive device 100 to communicate wirelessly with another device, for example, a desktop or laptop computer, a hand held computer, a mobile phone and/or a wireless access point, e.g., a "hot spot." Interactive device 100 may wirelessly access content on such another device, e.g., a nearby computer, or utilize such a device to access yet another device, e.g., via a network, for example, the internet.

Similarly, optional wired connector 124 may enable interactive device 100 to communicate wirelessly with another device, for example, a desktop or laptop computer, a hand held computer, a mobile phone or the like, in accordance with embodiments of the present invention. Wired connector 124 may be compatible with any suitable wired communication protocol, including, for example, RS-232, universal serial bus (USB), Inter-Integrated Circuit (I²C) communications, serial peripheral interface (SPI) communications, optical communications and the like. Interactive device 100 may utilize wired connector 124 to access content on another device, e.g., a nearby computer, or utilize such a device to access yet another device, e.g., via a network, for example, the internet.

Optional removable cartridge memory 123 may enable interactive device 100 to receive computer readable information that has been stored onto removable cartridge memory 123 by another device. Optional removable cartridge memory 123 may comprise any suitable data storage medium, for example, data storage devices compatible with a Secure Data (SD) card, multi-media card (MMC), compact flash (SF) card, PC Card, diskette and the like.

Optional buttons 126 may include, for example, buttons to control operation of interactive device 100, in particular the rendering of audio material that is associated with printed media. Exemplary button functions include power, play, stop, repeat, pause, volume control, next (go to the next book stored in the interactive device 100) and the like.

Figure 2:
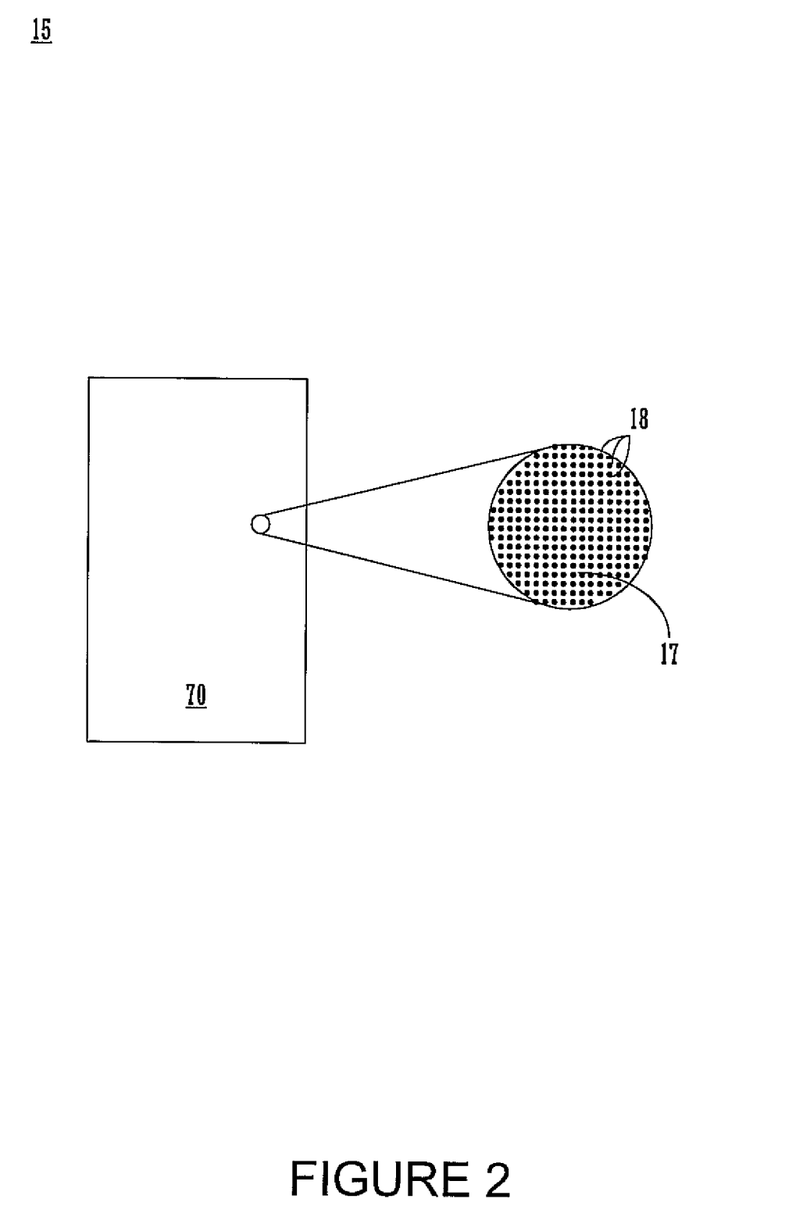
FIG. 2 shows an exemplary image bearing surface provided with a pattern of location determining marks, in accordance with embodiments of the present invention.

FIG. 2 shows an exemplary image bearing surface 15 provided with a pattern of location determining marks, in accordance with embodiments of the present invention. In the embodiment of FIG. 2, image bearing surface 15 is provided with a coding pattern in the form of optically readable position code 17 that consists of a pattern of marks 18. The marks 18 in FIG. 2 are greatly enlarged for the sake of clarity. In actuality, the marks 18 may not be easily discernible by the human visual system, and may appear as grayscale or "halftone" effect on image bearing surface 15. In one embodiment, the marks 18 are embodied as dots; however, the present invention is not so limited. In one embodiment, the dots are permanently printed on the image bearing surface.

Figure 3:
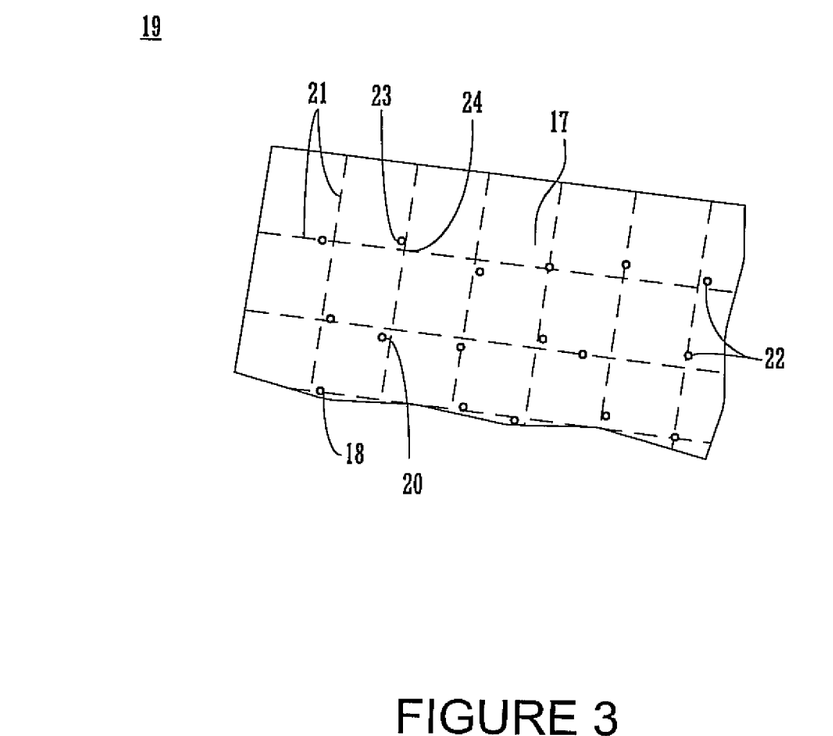
FIG. 3 shows an enlarged portion of the position code of FIG. 2, in accordance with embodiments of the present invention.

FIG. 3 shows an enlarged portion 19 of the position code 17 of FIG. 2, in accordance with embodiments of the present invention. An interactive device such as interactive device 100 (FIG. 1) is positioned to capture an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the image bearing surface 70. Thus, by matching the pattern in the image/raster with a pattern in the reference system, the position of the pattern on the surface 70, and hence the position of the optical device relative to the surface 70, can be determined.

In one embodiment, the pattern of marks on image bearing surface 15 comprises substantially invisible codes. The codes are "substantially invisible" to the eye of the user and may correspond to the absolute or relative locations of the selectable items on the page. "Substantially invisible" also includes codes that are completely or slightly invisible to the user's eye. For example, if dot codes that are slightly invisible to the eye of a user are printed all over a sheet of paper, the sheet may appear to have a light gray shade when viewed at a normal viewing distance and/or without magnification. It should be appreciated that although dot patterned codes are specifically described herein, other types of substantially invisible codes may be used in other embodiments of the present invention.

Anoto AB, a Swedish company, employs a technology that uses an algorithm to generate a pattern that enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

A particular instance of an image bearing surface, e.g., image bearing surface 70 of FIG. 2, may comprise an encoded pattern of location information as described previously. The specific location information encoded into the image bearing surface, or "dot-space" of the image bearing surface, may generally be known an interactive device, e.g., interactive device 100 (FIG. 1). It is appreciated that embodiments in accordance with the present invention are well suited to other optical reading and/or position sensing technology and are not limited to the exemplary "Anoto" technology.

For example, an interactive device may associate a first location encoding, or "dot-space," with a first application, e.g., a specific book title. Consequently, whenever that first location is detected, e.g., an interactive device scans a piece of paper with the first location encoding, the interactive device executes software associated with the specific book. In this case, the dot-space of the paper is known to the interactive device.

In accordance with embodiments of the present invention, an interactive device may have information of a plurality of dot spaces, e.g., the interactive device "knows" several different books. For example, the device 100 may be able to recognize a plurality of books by "touching," e.g., recognizing a position code, a page of such a book. The position code associated with the recognized book, or other type of printed matter, allows device 100 to identify the particular book that has been touched.

In accordance with other embodiments of the present invention, an interactive device may be associated with a particular application, e.g., a specific book title, and may not have information about other applications utilizing the same dot space. For example, an interactive device only "knows" a single book, whereas a different interactive device only "knows" a different single book. In this manner, a particular dot space may be reused for different applications In accordance with alternative embodiments of the present invention, removable cartridge memory 123 (FIG. 1), wireless unit 121 and/or wired connector 124 may be utilized to communicate software, e.g., including audio information, and dot space information to interactive device 100. In this manner, interactive device 100 may associate a particular dot space with a particular printed media, and determine the proper interactions, including audio output, associated with particular locations within the printed media, e.g., a particular book.

Figure 4:
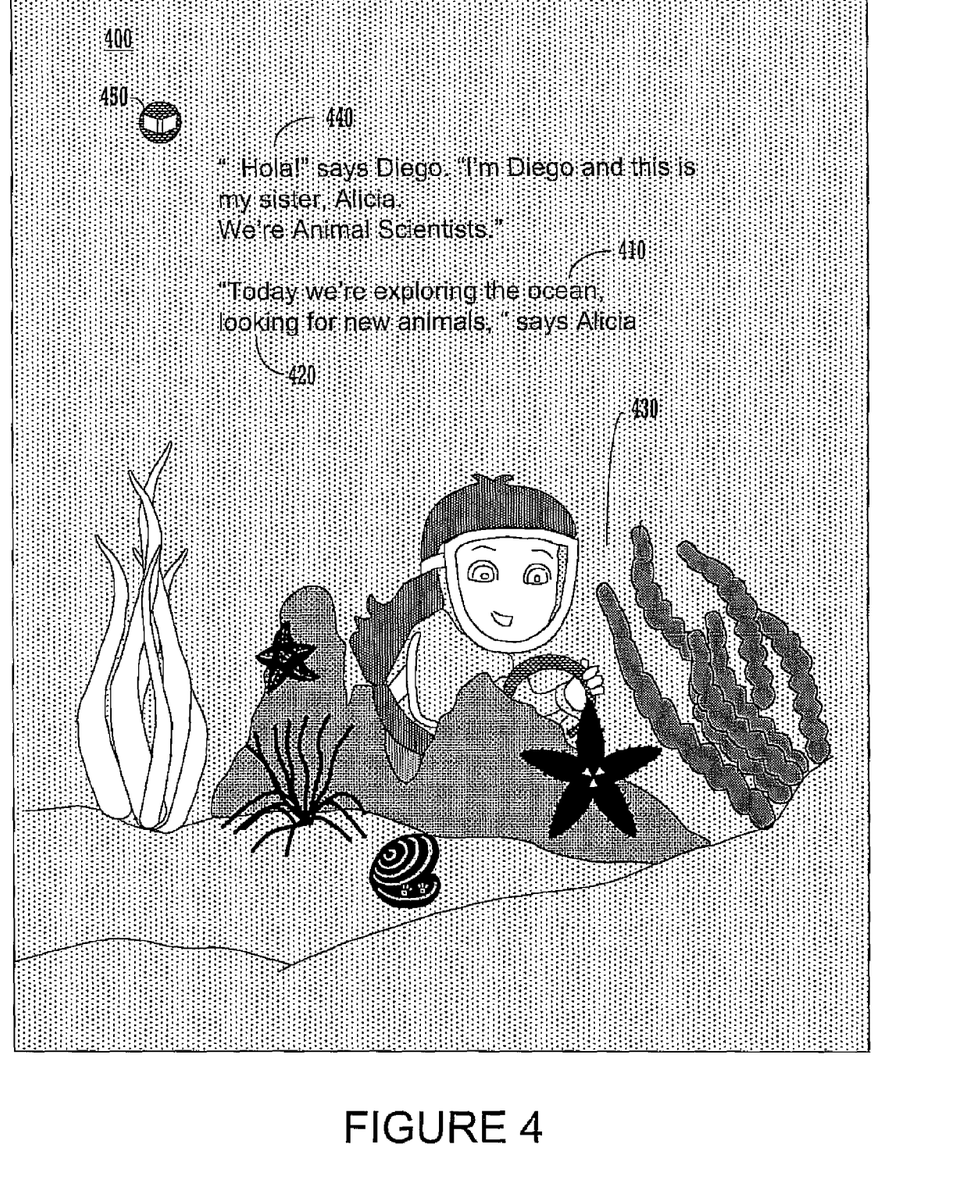
FIG. 4 illustrates an exemplary printed page of material comprising exemplary text and exemplary graphics, in accordance with embodiments of the present invention.

In accordance with embodiments of the present invention, interactive device 100 (FIG. 1) may "read" a book aloud. FIG. 4 illustrates an exemplary printed page 400 of material comprising exemplary text and exemplary graphics, in accordance with embodiments of the present invention. Page 400 may be a part of a children's book, for example, but is well suited to any material having textual information and/or images. Printed page 400 also comprises a substantially invisible position code, printed on the page. The position code may define a dot space that uniquely identifies page 400 within its book, or the position code of page 400 may be unique within a plurality of books.

In response to indicating text, for example, placing interactive device 100 on, over, above or near to printed text, e.g., text 410, interactive device 100 produces an audible output that speaks the word based on audio content stored in memory and corresponding to the position codes or dot space of the selected text. The audio output may be produced by text to speech technology, playback of recorded human speech, or any other suitable audio output technology.

In accordance with an embodiment of the present invention interactive device 100 (FIG. 1) determines its position within a dot space by interpreting the substantially invisible position code in the vicinity of, or within text 410. In accordance with embodiments of the present invention, a substantially invisible position code may be printed over or under the printed image, e.g., the lines, of text 410. For example, multicolor printing is generally performed in a plurality of printing "passes." In accordance with embodiments of the present invention, the position code may be printed in passes before and/or after a pass that prints text 410, and occupy the same two-dimensional space as text 410 within the plane of printed page 400.

In accordance with an embodiment of the present invention, the position within a dot space determined by interactive device 100 (FIG. 1) determines the appropriate audio output, e.g., speaking the word "ocean." For example, it is not necessary for interactive device 100 to optically recognize the text 410. Rather, interactive device 100 may determine where it is positioned on the page, or within the book or other dot space, and determines an audio output associated with that position, as stored in computer memory, e.g., removable cartridge memory 123 (FIG. 1).

In accordance with embodiments of the present invention, a variety of responses to indicating, e.g., touching, text 410, are available. For example, responsive to a user touching a word, the device 100 may provide a syllable-by-syllable pronunciation of the word. Alternative, the device 100 may provide audio and/or visual (e.g., via a display) output indicating the part of speech of the text, e.g., noun, verb, gerund, etc.

In accordance with embodiments of the present invention, interactive device 100 may produce audio output corresponding to a variety of text structures. For example, responsive to placing interactive device 100 over a single word of text, interactive device 100 may "speak" that single word, or a portion, e.g., a syllable, of the word. For example, the audio output may be limited to speaking only the indicated word, even though the page comprises multiple words and/or multiple sentences. Alternatively, interactive device 100 may "speak" only the particular sentence comprising the word, even though the page comprises multiple sentences. Those skilled in the art will recognize equivalent behaviors for non-alphabetic languages.

Similarly, when interactive device 100 (FIG. 1) is removed from the vicinity of text 410 and repositioned on, over, above or near to printed text 420, interactive device 100 produces audio output for the word "looking."

In accordance with embodiments of the present invention, audio output of interactive device 100 (FIG. 100) is not limited to voice or speech. For example, responsive to placing interactive device 100 on, over, above or near to exemplary graphics 430, interactive device 100 may produce audible sounds associated with such graphics, for example, "ocean-like" sounds or other sound effects, including noise or noises, for instance. In accordance with an alternative embodiment of the present invention, interactive device 100 may produce or play music. It is appreciated that, in general, the voice, speech, sounds, sound effects and/or music will generally be related to the image with which they are associated, in order to enhance learning and entertainment.

It is to be appreciated that interactive device 100 (FIG. 100) may be multi-lingual. For example, text 440 is a word in the Spanish language. In response to placing interactive device 100 on, over, above or near to printed text 440, interactive device 100 produces an audible output that speaks the word, in this example, in Spanish. Since interactive device 100 may determine its audio output based upon position, e.g., within a page or book, it may "switch" languages in a more straight-forward manner than other devices that, for example, rely on text recognition.

Interactive device 100 (FIG. 1) is capable of reacting to other, non-text, symbols. For example, placing interactive device 100 on, over, above or near to symbolic instruction 450 may cause interactive device 100 to produce audio output for the text of the entire page 400 continuously, including, for example, appropriate speech patterns corresponding to the printed punctuation, including, for example, pauses, accents, inflections and the like.

Figure 5:
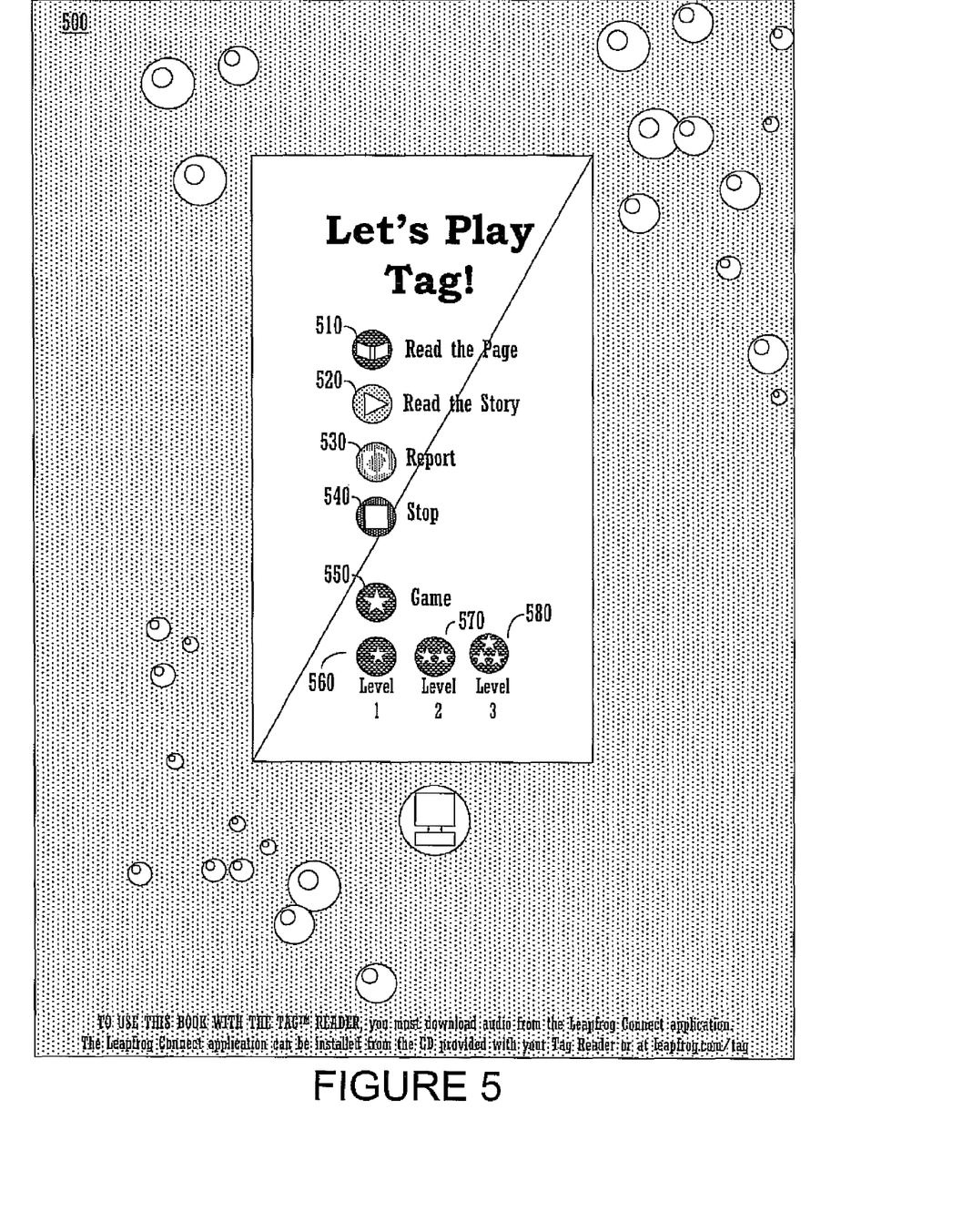
FIG. 5 illustrates an exemplary legend page, in accordance with embodiments of the present invention.

FIG. 5 illustrates an exemplary legend page 500, in accordance with embodiments of the present invention. Legend page 500 comprises a position code. Legend page 500 provides a printed legend or "key" to various special symbols and/or controls for use with the interactive device 100 (FIG. 1) and/or a book. The pen computer need only indicate, e.g., be placed on, over, above or near, the symbol to invoke the corresponding function.

Symbolic instruction 510 is used to read the page, as previously described with respect to symbolic instruction 450 (FIG. 4). When indicated, e.g., placing interactive device 100 on, over, above or near to, symbolic instruction 510 on page 500, interactive device 100 may "speak" the associated text "read the page," indicating to a user the function of symbolic instruction 510 when the same symbol appears elsewhere. It is appreciated that the "read the page" function may "read" passages, stanzas, chapters or other sub sections of a book that may span more than one printed page, and is not limited to producing audio output for exactly one printed page.

In accordance with embodiments of the present invention, the page may be "read" without further interaction with printed matter. For example, it is not necessary to indicate each word on a page in order for the interactive device 100 to produce audio output for each textual word, responsive to indicating symbolic instruction 450. Device 100 may provide an audio cue to turn the page when the end of a page has been reached, in one embodiment.

In a similar manner, symbolic instruction 520 is associated with an operation to "read the story," e.g., to produce continuous speech corresponding to the entire book. On page 500, indicating symbolic instruction 520 produces audio output "read the story" indicating to a user the function of symbolic instruction 520 when the same symbol appears elsewhere.

Likewise, symbolic instruction 530 is associated with an operation to "repeat," for example, to repeat the previous output, e.g., a word, sound or the entire story. On page 500, indicating symbolic instruction 530 produces audio output "repeat" indicating to a user the function of symbolic instruction 530 when the same symbol appears elsewhere.

Symbolic instruction 540 is associated with an operation to "stop," for example, to cease an operation in progress, e.g., reading the story. On page 500, indicating symbolic instruction 540 produces audio output "stop" indicating to a user the function of symbolic instruction 540 when the same symbol appears elsewhere.

Symbolic instructions 550-580 are associated with games that correspond to the story and may help to enhance learning and comprehension. On page 500, indicating symbolic instruction 550-580 produces audio output describing to the function, whereas indicating symbolic instruction 550-580 elsewhere initiates the corresponding action.

Figure 6:
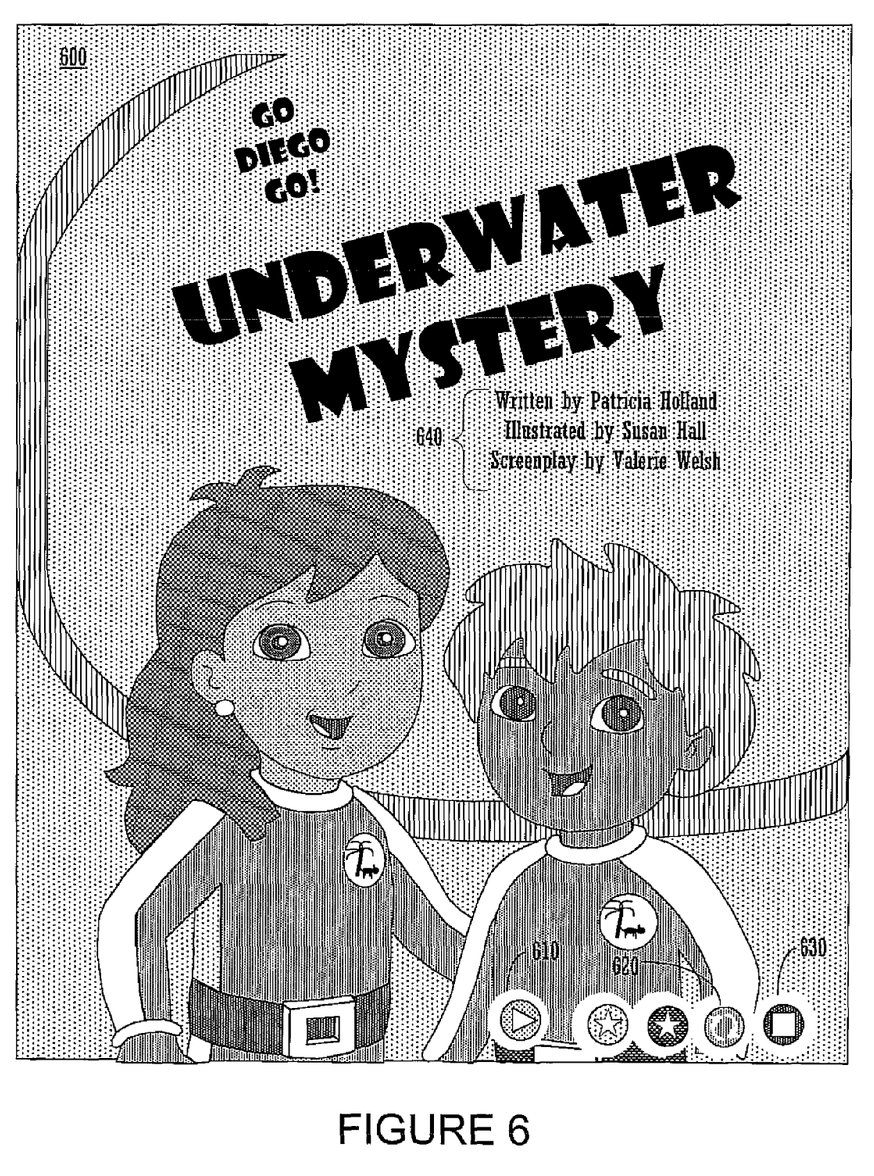
FIG. 6 illustrates an exemplary title page, in accordance with embodiments of the present invention.

FIG. 6 illustrates an exemplary title page 600, in accordance with embodiments of the present invention. Title page 600 comprises a position code, printed author information 640, and a plurality of symbolic instructions, e.g., symbolic instructions 610, 520 and 630. Indicating symbolic instruction 610 on page 600 causes interactive device 100 (FIG. 1) to "read" the entire book aloud in a continuous fashion. In accordance with an embodiment of the present invention, reading the entire book also reads the book title and author information 640. In accordance with embodiments of the present invention, the entire story may be "read" without farther interaction with printed matter. For example, it is not necessary to indicate each word on a page in order for the interactive device 100 to produce audio output for each textual word, responsive to indicating symbolic instruction 610.

Indicating symbolic instruction 630 on page 600 causes interactive device 100 (FIG. 1) to stop its present operation, e.g., reading the entire book aloud in a continuous fashion. Indicating symbolic instruction 620 on page 600 causes interactive device 100 to repeat or start over its previous operation, e.g., reading the entire book aloud in a continuous fashion.

It is appreciated that, in accordance with embodiments of the present invention, the interactive device 100 (FIG. 1) does not have to recognize symbolic instructions, e.g., 610-630, but rather associates their position with the corresponding function.

Referring once again to FIG. 1, interactive device 100 may comprise a plurality of input buttons 126. In accordance with embodiments of the present invention, input buttons 126 may be activated by a user to initiate various control functions of interactive device 100. For example, one of input buttons 126 may represent a "read the story" function. It is appreciated that interactive device 100 may produce continuous audio output of the story without reference to printed material, e.g., a book, in one embodiment. In this manner, a user of interactive device 100 may listen to audio output of a story produced by interactive device 100 without having the book nearby.

In accordance with embodiments of the present invention, a digital rights management (DRM) function may require that interactive device 100 touch a book, e.g., recognize a position code of the book, prior to any audio playback. For example, in accordance with this embodiment, operation of the "read the story" function described previously would require a prior touch of the printed material. For example, if the interactive device had never touched the physical book, the audio content would not play. In this novel manner, audio and other software may be downloaded or reloaded into interactive device 100 without direct charge, while advantageously preserving the rights of the authors, publishers and the like.

As previously described, an interactive device, e.g., interactive device 100 (FIG. 1), may comprise audio associated with more than one books. Multiple titles may be stored in the memory, including internal and/or removable cartridge memory. A "next" button among input buttons 126 may enable a user to cycle, e.g., in the manner of a circular queue, through multiple books or titles stored on an interactive device, selecting one to be "read." For example, responsive to activation of a "next" button, an interactive device may announce the title of a story or book loaded into the interactive device. Subsequent activation of a "next" button would announce the title of another story of book loaded into the interactive device. Subsequent activation of a "read the story" or "play" button would read the chosen story, for example, from the start of the story and/or from a previously stopped last position.

Figure 7A:
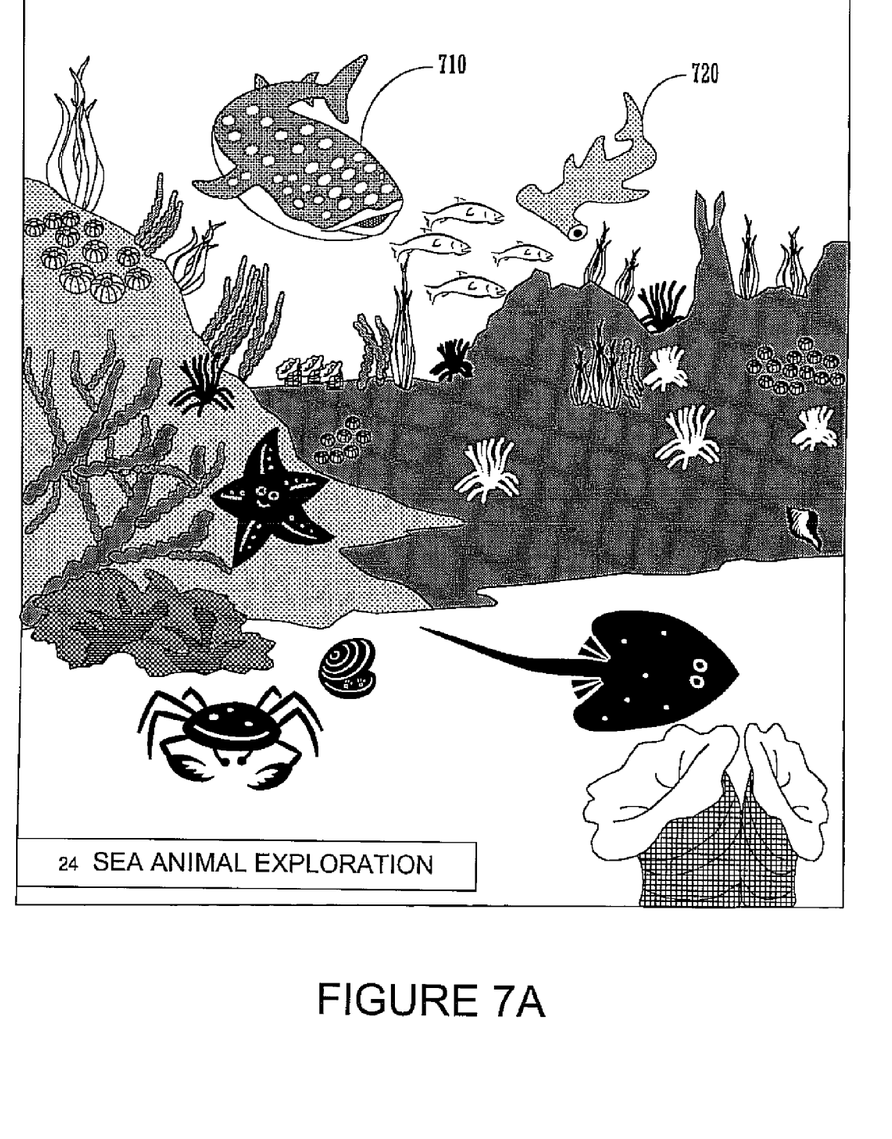
FIGS. 7A and 7B illustrate a learning game that may be used in combination with the pen based computer system, in accordance with embodiments of the present invention.
Figure 7B:
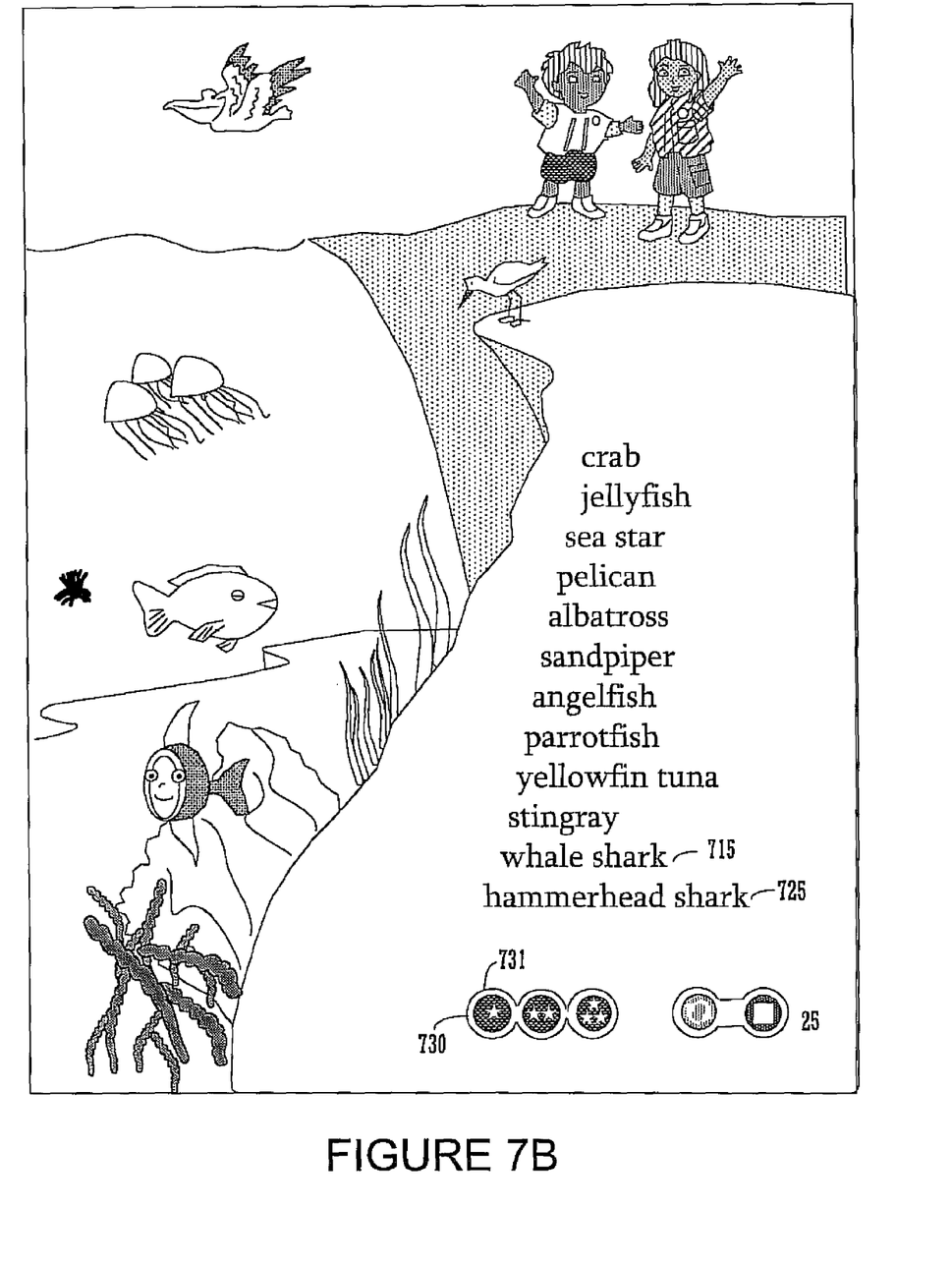

FIGS. 7A and 7B illustrate a learning game that may be used in combination with the pen based computer system, in accordance with embodiments of the present invention. FIG. 7A comprises illustrations of many forms of sea life as well as a position code, in accordance with embodiments of the present invention. FIG. 7B comprises printed text of the names of the sea life illustrated in FIG. 7A, as well as a position code, in accordance with embodiments of the present invention. In accordance with an embodiment of the present invention, responsive to placing interactive device 100 (FIG. 1) on, over, above or near to image 710, interactive device 100 produces an audible output that identifies the sea creature, e.g., speaking the words "whale shark."

In addition to speaking the words "whale shark," an additional audible instruction may be made, instructing the user to find the name of the animal on the page 7B. Responsive to placing interactive device 100 (FIG. 1) on, over, above or near to image 715, interactive device 100 produces an audible output that indicates success. For example, the device 100 may speak "congratulations!" In addition, device 100 may output music and/or sound effect(s) indicating success, e.g., a reward sound. In this manner, a user is helped to form additional associations of text with images, enhancing a learning process.

In response to placing interactive device 100 over other text, e.g., text 725, interactive device 100 produces an audible output that indicates that choice to be incorrect. Interactive device 100 may then produce audio output corresponding to the incorrect text, e.g., "Sorry. The word you selected is 'hammerhead shark.' Please try again to find the words 'whale shark.'" In addition, device 100 may output music and/or sound effect(s) responsive to an incorrect indication.

Symbolic instructions 730 enable a user to select a difficulty level of a game. For example, indicating symbolic instruction 731 may instruct the interactive device 100 to execute game software associated with the book title and/or position of symbolic instruction 731 at a beginning level. In addition, the interactive device 100 may produce audio speech output confirming the level selection, e.g., "Play the game at Level One."

Herein, and more generally, symbolic instructions may be used to modify operational parameters of the interactive device 100. Modifiable operational parameters may also be adjusted or modified by input buttons 126, if present. Modifiable operational parameters may include, for example, audio volume, playback speed, level of difficulty, vocal characteristics, e.g., male or female voice, child or adult voice, selection of reward sounds and the like.

Figure 8:
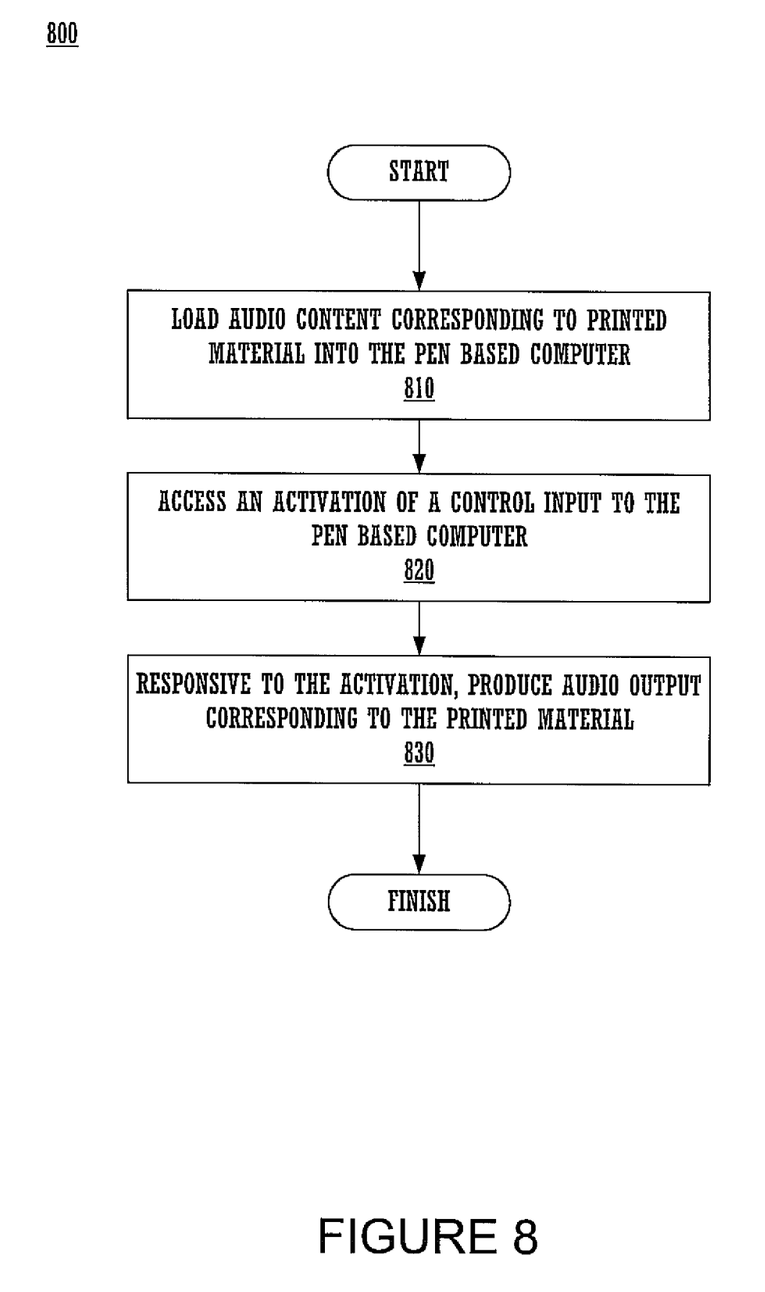
FIG. 8 illustrates a flow chart of a computer-implemented method for producing audio output from a pen based computer, in accordance with embodiments of the present invention.

FIG. 8 illustrates a flow chart of a computer implemented method 800 for producing audio output from a pen based computer, in accordance with embodiments of the present invention. In 810, audio content corresponding to printed material is loaded into the pen based computer. The audio content comprises audio speech of a textual word contained in the printed material. Loading of a title may be accomplished by inserting a removable cartridge memory, e.g., cartridge memory 123 (FIG. 1), into the pen computer or by downloading, e.g., via wireless unit 121 and/or wired connector 124, the title into existing memory, e.g., internal memory unit 114, of the pen computer.

In 820, an activation of a control input to the pen based computer is accessed. In accordance with embodiments of the present invention, the control input may be, for example, activation of a button, e.g., input buttons 126 (FIG. 1), and/or determination of a printed position code, e.g., position code 17 (FIG. 2).

In 830, responsive to the activation, audio output corresponding to the printed material is produced. In accordance with embodiments of the present invention, the audio output may comprise spoken word output corresponding to a word in the printed material. The audio output may comprise spoken word output corresponding to a multiword passage of the printed material. The audio output may comprise non word sounds corresponding to non word images of the printed material. In accordance with an alternative embodiment of the present invention, the audio output may be produced without the pen based computer accessing the printed matter. For example, the pen based computer may comprise audio corresponding to the text of the printed material. Responsive to a button input, e.g., buttons 126 (FIG. 1), the pen based computer may output the entire story, without a user indicating any text in the corresponding printed material.

Figure 9:
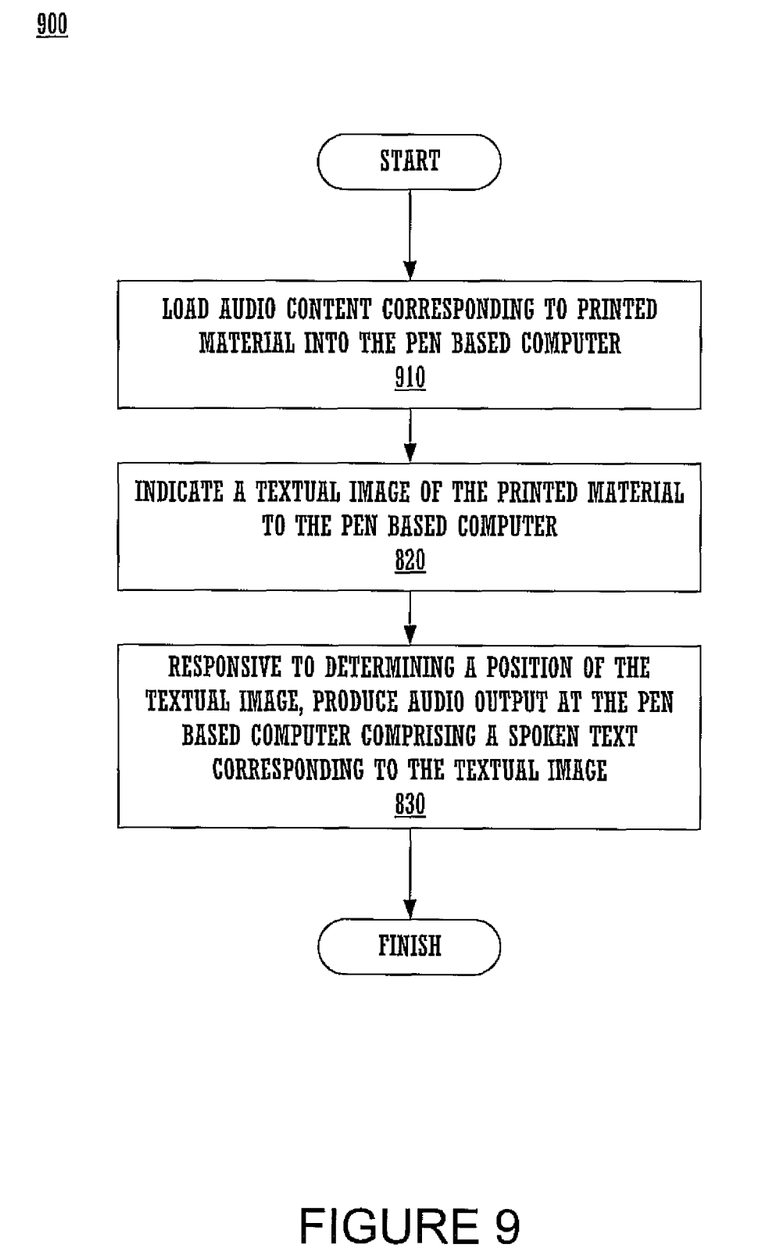
FIG. 9 illustrates a flow chart of a computer implemented method for producing audio output from a pen based computer, in accordance with alternative embodiments of the present invention.

FIG. 9 illustrates a flow chart of a computer implemented method 900 for producing audio output from a pen based computer, in accordance with embodiments of the present invention. In 910, audio content corresponding to printed material is loaded into the pen based computer. The audio content comprises audio speech of a textual word contained in the printed material. Loading of a title may be accomplished by inserting a removable cartridge memory, e.g., cartridge memory 123 (FIG. 1), into the pen computer or by downloading, e.g., via wireless unit 121 and/or wired connector 124, the title into existing memory, e.g., internal memory unit 114, of the pen computer. The removable cartridge memory may be provided with the printed material, in one embodiment. For example, the removable cartridge memory is included in retail packaging of a book. The book and removable cartridge memory may be sold separately from the pen based computer.

In 920, a textual image of the printed material is indicated to the pen based compute. For example, the pen based computer is placed on, over, above or near to a textual image of the printed material. The pen based computer may not be required to actually contact the printed material, in one embodiment. The printed material comprises a substantially invisible position code.

In 930, responsive to determining a position of the textual image, audio output comprising a spoken text corresponding to the textual image is produced by the pen computer contemporaneously with the indication of the textual image. For example, indicating, or placing the pen based computer on text 410 (FIG. 4) will cause the pen based computer to output the spoken word "ocean" at substantially the same time that the indication takes place.

In accordance with embodiments of the present invention, interactive device 100 may collect and record information corresponding to user behavior and/or usage of interactive device 100. For example, interactive device 100 may record book titles read, number of times a title has been read, rate of reading, words selected more than once, test results and the like. This information may be uploaded to a computer and/or website and used to visually present a user's development. Collection and use of such usage information is described in more detail in commonly owned, co-pending U.S. patent application Ser. No. 12/119,018, entitled "User Interfaces and Uploading of Usage Information," filed May 12, 2008 to Gray et al., and in commonly owned, co-pending U.S. patent application Ser. No. 12/119,083, entitled "Methods and Systems that Monitor Learning Progress," filed May 12, 2008 to Gray et al. These applications are hereby incorporated herein by reference in their entireties.

Embodiments in accordance with the present invention provide for systems and methods for rendering interactive audio books for pen based computers with an enhanced user experience. In addition, embodiments in accordance with the present invention provide for systems and methods for rendering interactive audio books for pen based computers that facilitate portability. Embodiments in accordance with the present invention also provide for systems and methods for associating audio sounds with positions within printed material for pen based computers. Further, embodiments in accordance with the present invention provide for systems and methods for audio books for pen based computers that are compatible and complementary with existing pen based computers, computer peripherals, methods of web access and printing processes.

Various embodiments of the invention are thus described. While the present invention has been described in particular embodiments, it should be appreciated that the invention should not be construed as limited by such embodiments, but rather construed according to the below claims.

What is claimed is:

1. A system comprising:
a pen-based computer system for determining a position of a human viewable image on a media responsive to interaction between said image and said pen based computer system;
wherein said determining comprises recognizing a substantially invisible position code; and
wherein said pen-based computer is further operable to modify an operational parameter of said pen-based computer system responsive to said determining.

2. The system of claim 1 wherein said human viewable image is produced independent of said pen based computer.

3. The system of claim 1 wherein said human viewable image comprises a symbolic instruction to said pen-based computer system.

4. The system of claim 1 wherein said human viewable image comprises a substantially non textual image of an object.

5. The system of claim 1 wherein a modification of said operational parameter causes said pen-based computer to produce a human-audible output corresponding to more than one human viewable images on said media.

6. The system of claim 5 wherein said human-audible output comprises music.

7. The system of claim 5 wherein said human-audible output comprises a sound effect.

8. The system of claim 5 wherein said human-audible output comprises a phrase of spoken language corresponding to a phrase of text.

9. The system of claim 5 wherein:
said human-audible output comprises repeating a previous human-audible output.

10. The system of claim 9 wherein said pen based computer system comprises a memory capable of storing audio content corresponding to a first and a second children's books.

11. The system of claim 10 wherein said pen based computer system is further capable of distinguishing said first children's book from said second children's book by touching the pen based computer system to any location on said first children's book.

12. The system of claim 11 wherein said pen based computer system is further capable of downloading said audio content of said first children's book and said audio content from said second children's book from a computer.

13. The system of claim 9 wherein said pen based computer system is further capable of continuously producing audio output corresponding to a reading of substantially all of the printed words of said first children's book by pressing a button on said pen based computer system.

14. The system of claim 13 wherein said pen based computer system is further capable of producing audio output corresponding to said first children's book by pressing said button on said pen based computer system only if said pen based computer system has previously touched said first children's book.

15. The system of claim 5 wherein said human-audible output comprises a name of said symbolic instruction.

16. A method comprising:
loading audio content corresponding to printed material into a pen based computer, wherein said audio content comprises audio speech of a plurality of textual words contained in said printed material;
accessing an activation of a control input to said pen based computer; and
responsive to said activation, producing audio output corresponding to said printed material,
wherein said printed material is a book comprising pages and wherein further said audio output corresponds to textual words of said pages,
wherein said pen based computer is configured to selectively produce audio output corresponding to a single word of said textual words or produce audio output corresponding to more than one consecutive word of said textual words responsive to an operational parameter of said pen-based computer,
wherein said operational parameter may be changed by said control input to said pen-based computer.

17. The method of claim 16 wherein said control input comprises determining a position code of said printed material.

18. The method of claim 16 wherein said control input comprises activation of a button of said pen based computer.

19. The method of claim 18 wherein said audio output is produced without said pen based computer accessing said printed matter.

20. The method of claim 16 wherein said audio output comprises spoken word output corresponding to a word in said printed material.

21. The method of claim 20 wherein said audio output comprises spoken word output corresponding to a multi-word passage of said printed material.

22. The method of claim 16 wherein said audio output comprises non word sounds corresponding to non word images of said printed material.

23. A pen based computer system for interaction with pre-printed material comprising:
a processor;
a memory coupled to said processor and for storing audio content that is associated with positions of printed material;
an optical detector coupled to said processor;
said processor for receiving input from said optical detector to determine a position of said pen based computer system over printed material comprising a position code responsive to an interaction of said pen based computer system and said printed material;
an audio transducer for producing audio output under control of said processor;
wherein said pen based computer system is capable of producing audio output corresponding to said position contemporaneously with said interaction, and
wherein said audio output further corresponds with other positions that were not previously determined by said pen based computer system.

24. The pen based computer system of claim 23 wherein said audio output comprises a spoken word corresponding to printed text at said position.

25. The pen based computer system of claim 23 wherein said audio output comprises non word sounds corresponding to graphic images printed at said position.

26. The pen based computer system of claim 23 wherein said processor is further for obtaining software describing a correspondence between positions of said printed material and said audio output.

27. The pen based computer system of claim 23 wherein software describing a correspondence between positions within said printed material and said audio output is loaded into said pen based computer via a removable memory.

28. The pen based computer system of claim 23 further comprising a user operable button to command said processor to produce audio output corresponding to text of said printed material without reference to said printed material.

29. The pen based computer system of claim 23 wherein said pre-printed material comprises a first children's book including printed words.

30. The pen based computer system of claim 29 wherein:
said audio content comprises audio corresponding to said printed words of said first children's book;
wherein said pen based computer system is further capable of continuously producing audio output corresponding to a reading of substantially all of the printed words of said first children's book by selection of a symbol printed on said first children's book.

31. The pen based computer system of claim 30 wherein said memory is further capable of storing audio content corresponding to a second children's book.

32. The pen based computer system of claim 31 wherein said pen based computer system is further capable of distinguishing said first children's book from said second children's book by touching the pen based computer system to any location on said first children's book.

33. The pen based computer system of claim 32 wherein said pen based computer system is further capable of downloading said audio content of said first children's book and said audio content from said second children's book from a computer.

34. The pen based computer system of claim 30 wherein said pen based computer system is further capable of continuously producing audio output corresponding to a reading of substantially all of the printed words of said first children's book by pressing a button on said pen based computer system.

35. The pen based computer system of claim 34 wherein the pen based computer system is further capable of producing audio output corresponding to said first children's book by pressing said button on said pen based computer system only if the pen based computer system has previously touched said first children's book.

36. The pen based computer system of claim 29 wherein said pen based computer system is capable of producing audio output corresponding to a reading of a word printed on said first children's book by selection of said word.

* * * * *